April 26, 1955 — T. R. PRITCHARD — 2,706,977
MOTOR STARTING AID
Filed June 15, 1953
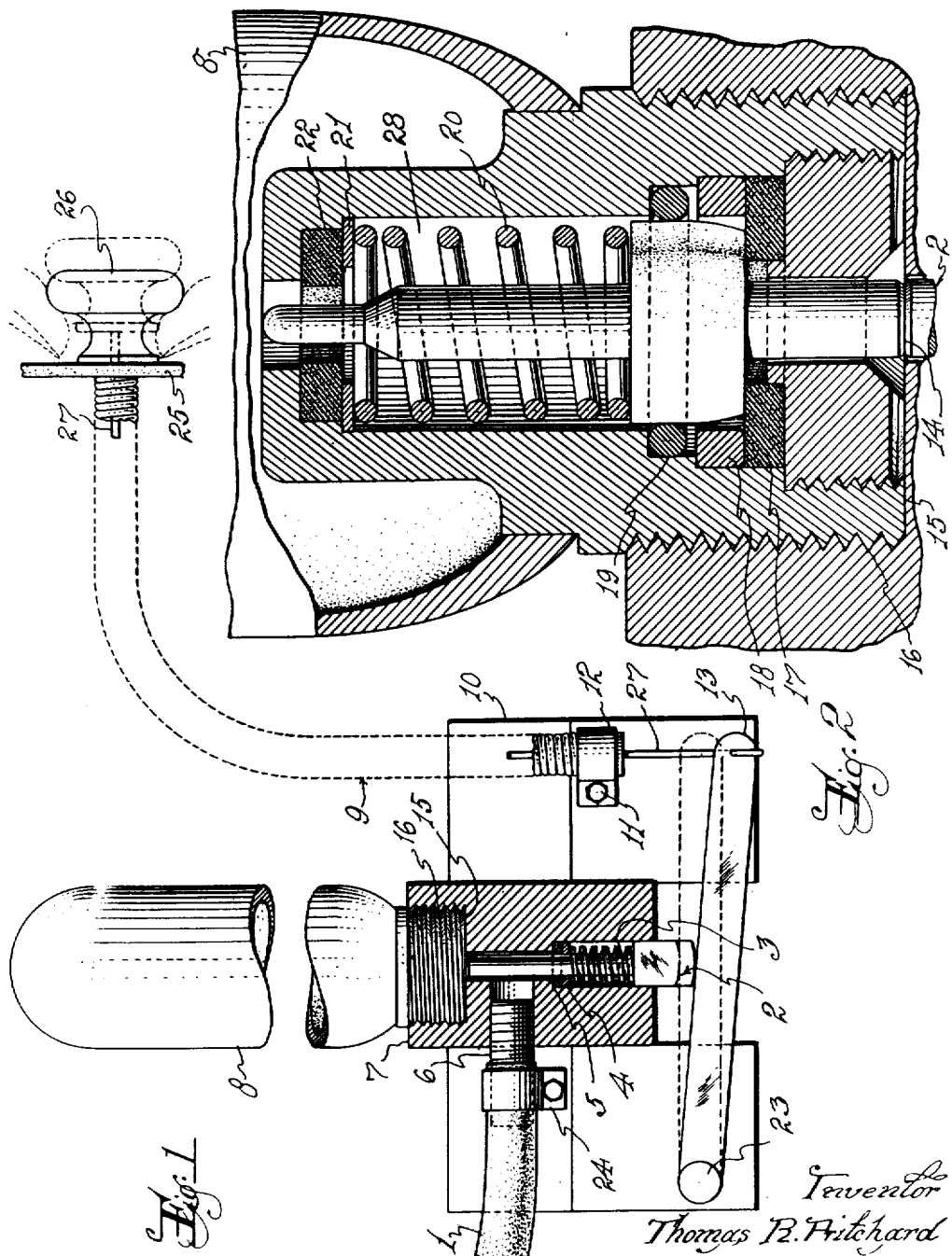
Inventor
Thomas R. Pritchard 2,706,977

MOTOR STARTING AID

Thomas R. Pritchard, Kearny, N. J., assignor to Tanra Manufacturing Co., Orange, N. J., a corporation of New Jersey Application June 15, 1953, Serial No. 361,475

5 Claims. (Cl. 123—187.5)

This invention relates to a motor starting aid and has for its object quick starting assistance for internal combustion engines.

Another object is to provide such starting assistance with a small compact unit, economical to fabricate and install on an internal combustion engine and in a motor vehicle.

Still another object is to provide means for readily replenishing the supply of auxiliary fuel required in the use of the starting aid.

Other objects will be apparent in the detailed description which follows.

This invention is illustrated in the accompanying drawings in which:

Figure 1 is an elevational view of the unit, partly in section, in operable position in a motor vehicle.

Figure 2 is an enlarged sectional view of the measuring valve incorporated in the cylinder of the unit.

Referring to the drawings in which the same reference number refers to the same or similar part, Figure 1 shows the starting aid secured adjacent to or on the engine block of a motor vehicle by means of bracket mounting 10. To bracket mounting 10, cable 9 leading to dash board 25 of the motor vehicle is attached by bolt 11 and clip 12. Within this protective cable there is contained wire 27 which may be pulled or pushed by knob 26 secured to it at its dashboard end. At the other end wire 27 is connected to lever 13 which is pivoted on pin 23, fixed on bracket mounting 10.

Hose clamp 24 attaches one end of rubber tubing 1 to bracket mounting 10 and permits a short length of copper tubing as connector 6 to connect tubing 1 with outlet port 29 of valve trigger housing.

Valve trigger housing 7 houses valve stem actuating rod 2 with its associated parts, namely spring 3 and washers 4 and 5. Threaded recess 15 is adapted to receive threaded neck 16 of cylinder 8 in close fit sealing engagement. The loose fit of rod 2 within the housing permits free fluid connection between recess 25 and outlet port 29.

Referring now to Figure 2 the valve mechanism housed within the end of cylinder 8 consists of valve stem 14 and sealing ring 22, in which the tapered shoulder of valve stem 14 is seated when the valve stem is in its most inward position. Metal washer 21 and spring 20, which bears against a shoulder of valve stem 14, cooperate to urge the valve stem outward of sealing ring 22. Washer 17, O ring 18 and O ring 19 normally seal off the valve and only when valve stem 14 is fully depressed and seated in sealing ring 22 will material confined in chamber 28 be permitted to escape from the chamber.

Cylinder 8 containing a compressed, highly volatile explosive gas, such as butane or the like, is screwed into the opening in valve trigger housing 7 and when completely seated, valve stem 14 will be in position to bear upon the end of rod 2. It will be noted that the valve mechanism which is contained within the neck of cylinder 8 will have in chamber 28 a measured quantity of the gas content of the cylinder ready for use. When knob 26 is pulled outward from the dashboard as shown in dotted outline in Figure 1, lever 13 will press rod 2 inward, as shown in dotted outline, displacing valve stem 14 from its sealing seat causing the end of the valve stem 14 to fill the opening in washer 22 thus closing the outlet of cylinder 8. After valve stem 14 is so seated, gas in chamber 28 may flow outward past valve stem 14, through connector 6, tubing 1 and thence into the engine manifold.

The starting aid, with cylinder 8 containing the auxiliary compressed gas fuel, is used while the motor, with ignition on, is being turned over preparatory to starting. Each manual opening of the valve closure permits the escape of a measured quantity of gas from the cylinder. This gas will be drawn into the manifold of the engine to be mixed with the regular fuel and thus assist in starting the engine.

When cylinder 8 has been emptied it may be readily removed and a filled cylinder substituted in its place.

Various materials and arrangements of parts may be used and it is not intended by the illustration herein given to thereby limit the scope of this invention.

What I claim is:

1. An internal combustion engine starting aid comprising a cylinder containing a compressed, highly volatile explosive gas; a valve incorporated therein adapted to permit the discharge of a measured quantity of the gas at each opening; a tubular passage connected at one end with the outlet port of the valve and connectable at its other end with the manifold of an internal combustion engine; and a finger piece operably connected with the valve.

2. An internal combustion engine starting aid comprising a body adapted to be secured to an internal combustion engine; a passage through the body; a container filled with a compressed, highly volatile explosive gas and having a measuring valve closure sealing its outlet, removably secured to the body with the valve projecting into the said passage; a tube connected at one end with the said passage and adapted to be connected at its other end with the manifold of an internal combustion engine; a rod partially within the said passage and partially without the body, in limited slidable sealing engagement in an opening in the body, positioned in valve actuating relationship; and means connected with the outward end of the rod for moving it inward or outward.

3. An internal combustion engine starting aid comprising a body adapted to be secured to an internal combustion engine; a passage through the body; a container filled with a compressed, high volatile explosive gas and having a measuring valve closure sealing its outlet, removably secured to the body with the valve projecting into the said passage; a tube connected at one end with the said passage and adapted to be connected at its other end with the manifold of an internal combustion engine; a rod partially within the said passage and partially without the body, in limited slidable sealing engagement in an opening in the body, positioned in valve actuating relationship; resilient means within the body urging the rod outward therefrom; an arm pivotally mounted to bear against the outward end of the rod; and manual arm moving means connected with the free end of the arm.

4. An internal combustion engine starting aid comprising a mounting for attaching the same to an internal combustion engine; a body secured to such mounting and having a longitudinal passage therethrough with a lateral passage therefrom opening out in a side of the body; a tube adapted to connect the outlet of the lateral passage with the manifold of an internal combustion engine; a rod limitedly slidable in the longitudinal passage; projecting outward of one end of such passage and sealing off such end; resilient means urging the rod outward from such end of the longitudinal passage; an arm pivotally attached to the mounting and positioned to bear against the outward end of said rod; means connected to the free end of the arm for rotating it about its pivot point; and a container with its outlet end removably secured to the open end of the longitudinal passage of the body, filled with a compressed, highly volatile explosive gas and having within its outlet end a measuring valve closure in displaceable relationship with the rod in the longitudinal passage.

5. A motor vehicle internal combustion engine starting aid comprising a mounting for attaching the same to the motor block of a motor vehicle internal combustion engine; a body secured to the mounting and having a longitudinal passage therethrough with a lateral passage therefrom opening out in a side of the body; a tube adapted to connect the outlet of the lateral passage with the manifold of a motor vehicle internal combustion engine; a rod limitedly slidable in the longitudinal passage, projecting outward of one end of such passage and sealing off such end; a spring within the passage urging the rod outward therefrom; an arm pivotally mounted on the said mounting and positioned to bear against the outward end of the rod; operable means connecting the free end of the arm with a fingerpiece adapted to be mounted on the dashboard of a motor vehicle; a container filled with a compressed, highly volatile explosive gas with its outlet removably secured within the open end of the said longitudinal passage; and a measuring valve closure secured within the outlet of the container in operable relationship with the rod in the longitudinal passage.

References Cited in the file of this patent

UNITED STATES PATENTS

| 2,364,356 | Greathouse | Dec. 5, 1944 |
| 2,641,240 | Levine | June 9, 1953 |
| 2,658,490 | Bevis et al. | Nov. 10, 1953 |

FOREIGN PATENTS

| 2,252 | Great Britain | Jan. 15, 1914 |